United States Patent [19]

Ziemek

[11] 4,221,670
[45] Sep. 9, 1980

[54] FILTER FOR LIQUIDS

[75] Inventor: Gerhard Ziemek, Langenhagen, Fed. Rep. of Germany

[73] Assignee: Kabel- und Metallwerke Gutehoffnungshütte AG., Hanover, Fed. Rep. of Germany

[21] Appl. No.: 11,301

[22] Filed: Feb. 12, 1979

[30] Foreign Application Priority Data

Feb. 25, 1978 [DE] Fed. Rep. of Germany ....... 2808215

[51] Int. Cl.² .............................................. B01D 39/10
[52] U.S. Cl. ................................ 210/474; 210/493 R; 210/497 R; 210/500 R
[58] Field of Search ................... 210/474, 481, 493 R, 210/497 R, 500 R; 55/522; 209/392, 397–399; 99/298

[56] References Cited

U.S. PATENT DOCUMENTS

| | | | |
|---|---|---|---|
| 3,426,910 | 2/1969 | Winzen | 210/497 X |
| 3,458,050 | 7/1969 | Cooper | 210/452 X |

*Primary Examiner*—William A. Cuchlinski, Jr.
*Attorney, Agent, or Firm*—Smyth, Pavitt, Siegemund, Jones & Martella

[57] ABSTRACT

The filter is constructed as a cylindrical or tapered body preferably having longitudinal grooves and ridges as flow channels, the body being made of thin metal, preferably gold plated nickel, to be self-supporting and having perforations to obtain a perviousness from 40 to 200 mesh (metric-DIN). A collar is affixed to suspend the filter in an opening. The filter material is preferably be made by electroplating.

6 Claims, 5 Drawing Figures

U.S. Patent    Sep. 9, 1980    4,221,670
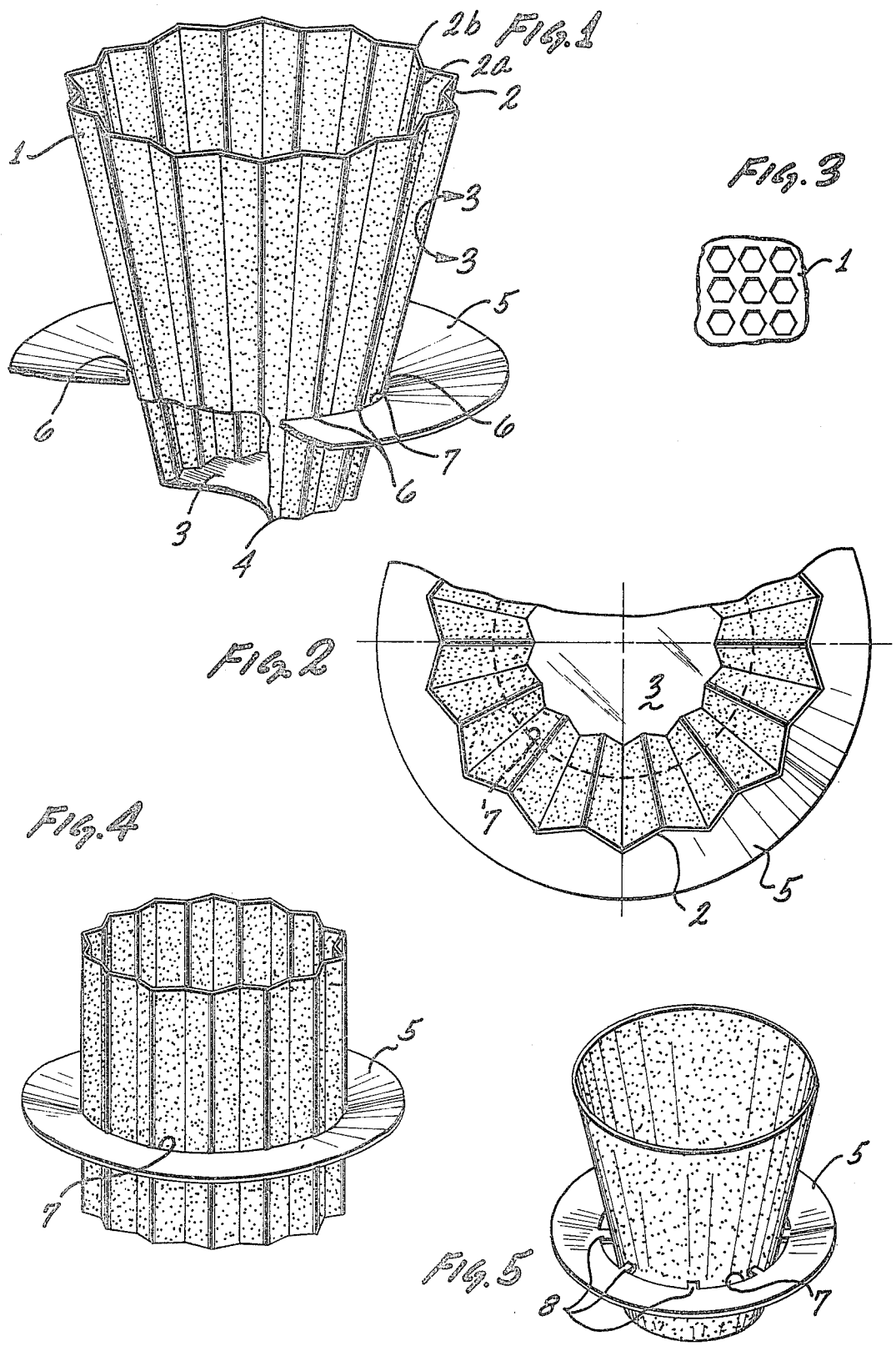

FILTER FOR LIQUIDS

BACKGROUND OF THE INVENTION

The present invention relates to a device for filtering liquid, and more particularly, the invention relates to a household filter, such as is used for filtering tea or coffee.

Numerous constructions are known for separating solids from liquids by means of filters. One of the most common configuration for filters is funnel-shaped. A typical example here is a coffee or tea filter for household use. The filter is a paper product and of the throwaway type after one use. Particularly, one uses a filter container having a contour which more or less matches the contour of the filter proper; after use, the latter is removed from the container. The container is rigid and serves primarily as folder for the filter and for guiding the liquid towards discharge openings.

Other types of filters are used in engineering in which generally filter layers are placed on support surfaces made of a different material. The German printed patent application Ser. No. 2,629,719 discloses a technical filter using paper, linen or porous plastic as support material. This reference mentions, however, that these materials are disadvantaged by higher compression, rather high tolerances as to thickness and by inhomogeneities as to structure. This patent suggests to remedy these disadvantages by providing a fine meshed wire web or mesh to support the filter proper.

All these several filter constructions are still disadvantaged by separate filter and support.

DESCRIPTION OF THE INVENTION

It is an object of the present invention to provide a new and improved filter which, in fact, is of simpler construction and operates more economically with less waste.

In accordance with the preferred embodiment of the present invention, it is suggested to provide a self-supporting metal filter body having side wall and, possibly, also bottom wall structure, the side wall structure being cylindrical or tapered, and is preferably provided with a pattern of longitudinally extending grooves and ridges. At least a portion of the metal wall is quite thin, preferably between 0.05 to 0.3 mm and has perforations to obtain a sieve like permeability at 40 to 200 mesh (metric DIN). Thus, the filter body supports itself and provides for the filter function. The filter body may be circumscribed by a, preferably, tapered collar to catch drops and permit suspension of the filter. A gap or gaps between the collar and the body permits passage of the liquid. The ridge and groove pattern establishes inherently such passages when the collar is affixed to the outwardly extending ridges.

The filter may be made by electrolytic precipitation, preferably nickel, using electrode means either having the body configuration or being flat to make strips or sheets out of which the filter body is then shaped. The filter should be plated with a noble metal, preferably gold, for avoiding even minute interaction between filtered liquid and filter body.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a perspective view of a filter in accordance with the preferred embodiment of the invention;

FIG. 2 is a top view of the filter shown in FIG. 1;

FIG. 3 is a detail of the filter shown in FIGS. 1 and 2, on a very enlarged scale; and FIGS. 4 and 5 are views similar to FIG. 1 but showing modified filter configurations. Proceeding now to the detailed description of the drawings, FIGS. 1 and 2 illustrate a funnel-shaped, tapering hollow body 1 of overall frustoconical configuration, but being provided with alternating, longitudinally extending ridges 2a and grooves 2b, as far as the inside is concerned; of course, the longitudinal grooves and ridges on the outside are respectively the ridges and grooves on the inside.

The filter is made of thin foil material having a thickness of about 0.15 mm, which is 6 mills. It was found that the thickness should not be below 0.05 mm (about 2 mills) as otherwise problems of stiffness will result. The thickness should not exceed about 0.3 mm or 12 mills, because the pores will more easily clog. The filter should have a permeability of about 40 to 200 mesh (metric-DIN) which is a mesh number range (US) from about 20 to 40. However, in special cases, the bottom may not be provided with filter flow perforations or the sides may not be so provided. Normally, however, perforated sheet metal is used throughout.

The parts 1 and 3 may have been made integrally by way of electrolytic precipitation on a correspondingly shaped templet-like electrode. Alternatively, strip or sheet material is made similarly by electroplating, but in larger sizes, and the sheet is then cut, and cut pieces are shaped into the corrugated-like pattern and folded in a funnel to be soldered along adjoining edges. Particularly, the bottom 3 may be separately soldered on, along a solder line 4.

In either case, one needs a templed and electrode surface which has the desired perforations so that the filter perforations are made during the precipitation. The openings may be simply of circular configuration or they may be polygonal e.s. hexagonal (FIG. 3). In the preferred form of practicing the invention, one will use electrolytes containing nickel as the precipitant, because it was found that a nickel filter will have particularly accurate mesh size and configuration and is adequately stiff. However, other metals can be used as well as long as they yield the desired mesh size and mechanical strength.

For visual reasons and also for reasons of taste, particularly in the case of household filter, one may wish to treat the surface, e.g. by providing it with a smooth surface finish or by depositing a lacquer or a layer of a noble metal. These coatings will not interfer with the filter function as long as they are sufficiently thin. Of particular advantage is gold plating which combines a pleasant appearance with complete absence of any effect on the taste, e.g. of the coffee or tea being filtered in that manner.

The primary function of the grooves and ridges in the filter wall is to establish sufficient stiffness in the filter as a whole. The resulting corrugation is basically of triangular contour, but could be curved instead. The outside grooves 2a, however, establish surprisingly the following additional function.

Liquid, such as coffee or a liquid otherwise free from larger size solid particles, passes through the filter walls, but accumulates in and runs along these outside grooves 2a. Thus, for reasons of surface tension the liquid having penetrated the filter wall does not drop off vertically by force of gravity, or only to an insignificant extent. The liquid will primarily, even almost exclusively, run along these outside grooves and drop off the bottom rim.

The filter body 1 is a completely self-contained body due to the fact that it is made of metal, and the corrugations enhance stiffness. Such a filter can be handled and does not require any supplemental support. As shown in FIG. 4, the filter body may have overall cylindrical configuration. This may be the case when the fluid is to be extracted radially. Alternatively, only the bottom may be perforated for this case. In other cases a bottom 3 may not be needed, as the liquid is extracted only laterally, or the bottom portions of the filter wall are joined along a line or merge into a true cone apex. Firm connection of the material at that connection line or point is needed to prevent unfiltered liquid from leaving through a leak.

FIGS. 1 and 2 show additionally a collar 5 which is an annulus whose inner opening 7 has a diameter half as larger than the diameter of the smallest outside circle along the outside ridges 2b, but smaller than the largest circle at the top opening of the filter. The rim of opening 7 is soldered to the outside ridges 2b at solder points 6. Alternatively, one may use welding or bonding by means of an adhesive.

The collar 5 could be flat, but preferred is, as illustrated, a slightly conical configuration, pertaining to a cone of very large apex angle. This collar has two functions. One, it is used for placement of the filter along the rim of a container, e.g. a coffee pot, so that the lower portion of the filter projects into the container. The second function is to catch all liquid that may drop off the outside of the filter.

It can also be seen that the outside grooves 2a establish gaps between the filter and the holder or collar 5 so that liquid can flow down unimpeded along the filter to drop off the bottom rim. In cases, one may not need or want to corrugate the filter wall (FIG. 5). In order to permit liquid to flow down, spacer bars 8 are needed to hold the collar 5 and to define a gap so that liquid penetrating filter wall is not stopped by the collar. The filter should be fairly thick in this case.

The collar shown in the various examples may be made of metal. Moreover, the surface finish outlined above may be provided when the collar is already attached, and the entire assembly is, e.g. gold plated. Alternatively, the collar may be made of plastic which is affixed to the filter in the stated manner after completion, including surface finishing the filter.

The invention is not limited to the embodiments described above but all changes and modifications thereof not constituting departures from the spirit and scope of the invention are intended to be included.

I claim:

1. A beverage filter comprising a thin-walled body of hollow construction including a cylindrical or tapered hollow portion, being at least open to one side, the body having a wall and bottom structure, at least a portion thereof being made of thin metal foil and having apertures defining a sieve-like permeability in the range of from 40 metric mesh to 200 metric mesh; the cylindrical or tapered portion being provided with longitudinal grooves and ridges; and a collar, circumscribing the said filter portion and being connected to these ridges to leave flow space along said grooves.

2. A filter as in claim 1, the wall structure having thickness selected from the range from 0.05 to 0.3 mm.

3. A filter as in claim 1, the collar being inwardly downwardly tapered.

4. A filter as in claim 1, the apertures being of polygonal configuration.

5. A filter as in claim 1, the filter being made of nickel.

6. A filter as in claim 5, said filter being gold plated.

* * * * *